US008942148B2

(12) United States Patent
Han et al.

(10) Patent No.: US 8,942,148 B2
(45) Date of Patent: Jan. 27, 2015

(54) METHOD AND APPARATUS FOR SWITCHING A FREQUENCY ASSIGNMENT IN A WIRELESS COMMUNICATION SYSTEM

(75) Inventors: Ki-Young Han, Yongin-si (KR); Jo-Seph Jeon, Seongnam-si (KR); Byoung-Ha Yi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 13/522,847

(22) PCT Filed: Jan. 19, 2011

(86) PCT No.: PCT/KR2011/000382
§ 371 (c)(1),
(2), (4) Date: Jul. 18, 2012

(87) PCT Pub. No.: WO2011/090310
PCT Pub. Date: Jul. 28, 2011

(65) Prior Publication Data
US 2012/0294214 A1    Nov. 22, 2012

(30) Foreign Application Priority Data
Jan. 19, 2010 (KR) .......................... 10-2010-0004956

(51) Int. Cl.
*H04B 7/00* (2006.01)
*H04W 72/00* (2009.01)
(Continued)

(52) U.S. Cl.
CPC ............ *H04W 36/0072* (2013.01); *H01Q 1/246* (2013.01); *H01Q 3/247* (2013.01); *H04W 36/06* (2013.01); *H04W 72/02* (2013.01); *H04W 72/042* (2013.01); *H04W 72/0453* (2013.01)

USPC ........................... 370/310; 455/447; 455/450

(58) Field of Classification Search
CPC ............ H04W 36/0072; H04W 72/02; H04W 72/0453; H04W 72/042; H04W 36/06; H04W 16/10; H04W 16/02; H04W 16/00; H04W 16/06; H04W 16/08; H01Q 1/246; H01Q 3/247
USPC ................................... 455/450, 447
See application file for complete search history.

(56) References Cited

U.S. PATENT DOCUMENTS

2005/0197133 A1    9/2005  Hong et al.
2008/0101294 A1    5/2008  Sung

FOREIGN PATENT DOCUMENTS

KR    10-2009-0072765 A    7/2009

*Primary Examiner* — Kwang B Yao
*Assistant Examiner* — Adam Duda
(74) *Attorney, Agent, or Firm* — Jefferson IP Law, LLP

(57) ABSTRACT

A method and an apparatus for switching a Frequency Assignment (FA) by a base station in a wireless communication system are provided. The method includes, upon detecting movement of the base station, communicating with a mobile terminal using a first FA via a first FA-transceiver among a plurality of FA-transceivers which process signals transceived via each of the plurality of FAs, and selecting, upon detecting a change in a wireless environment caused by the movement, a second FA from among the plurality of FAs, operating a second FA-transceiver which processes signals transceived via the second FA, transmitting, to the mobile terminal, a scanning-instructing message for instructing the reference signal transmitted via the second FA to be scanned, and switching the first FA to the second FA in accordance with the result of the scanning received from the mobile terminal in response to the scanning-instructing message.

15 Claims, 3 Drawing Sheets

(51) Int. Cl.
*H04W 40/00* (2009.01)
*H04W 36/00* (2009.01)
*H01Q 1/24* (2006.01)
*H01Q 3/24* (2006.01)
*H04W 36/06* (2009.01)
*H04W 72/02* (2009.01)
*H04W 72/04* (2009.01)

METHOD AND APPARATUS FOR SWITCHING A FREQUENCY ASSIGNMENT IN A WIRELESS COMMUNICATION SYSTEM

PRIORITY

This application is a National Stage application under 35 U.S.C. §371 of an International application filed on Jan. 19, 2011 and assigned application No. PCT/KR2011/000382, and claims the benefit under 35 U.S.C. §365(b) of a Korean patent application filed in the Korean Industrial Property Office on Jan. 19, 2010 and assigned Serial No. 10-2010-0004956, the entire disclosure of which is hereby incorporated by reference.

BACKGROUND OF THE INVENTION

1. Field of the Invention

The present invention relates to a wireless communication system. More particularly, the present invention relates to a method and an apparatus for switching a frequency assignment in a wireless communication system.

2. Description of the Related Art

Not only can a mobile base station, configured by mounting a base station on a moving vehicle, provide services to mobile terminals when in motion, it can also perform the same function as that of fixed base stations when it is stationary.

A mobile base station may include a plurality of sector antennas and an omni antenna, and the following two types of antenna operating schemes may be used depending on the movement of the mobile base station. In other words, the mobile base station may use a sector antenna operating scheme, in which a plurality of sector antennas are used, for expansion of the cell capacity while it is stationary, whereas the mobile base station may use an omni antenna operating scheme, in which an omni antenna is used, to increase its mobility and stability while it is moving.

When using the sector antenna operating scheme, the mobile base station uses different Frequency Assignments (FAs) for different sectors of its cell(s). Accordingly, the mobile base station may perform the same operation as when a plurality of base stations are used.

When using the omni antenna operating scheme, the mobile base station uses an FA only for one sector of its cell. Therefore, when the mobile base station moves while in the stationary state, some of a plurality of FAs in use may not be used.

While the mobile base station is moving, a wireless environment between base stations is dynamically changed. Accordingly, the mobile base station needs to support the optimal wireless environment by adjusting its FA and transmission power depending on the changed wireless environment. In addition, the mobile base station needs to continuously provide seamless services to mobile terminals in its cell despite the change in the wireless environment.

Therefore, a need exists for a method and an apparatus for switching a frequency assignment in a wireless communication system.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for switching a Frequency Assignment (FA) in a wireless communication system.

Another aspect of the present invention is to provide an FA switching method and apparatus for allowing a mobile terminal to switch an FA without interruption of services by a base station when an omni antenna is used due to movement of the base station, in a mobile communication system including a plurality of sector antennas and an omni antenna.

Another aspect of the present invention is to provide an FA switching method and apparatus for continuously providing services without deterioration of service quality by a mobile base station in a wireless communication system.

In accordance with an aspect of the present invention, a method for switching an FA by a base station in a wireless communication system is provided. The method includes upon detecting movement of the base station, performing communication with a mobile terminal using a first FA through a first FA transceiver among a plurality of FA transceivers, each of which individually processes a signal transmitted/received over each of a plurality of FAs, upon detecting a change in a wireless environment due to the movement, selecting a second FA from among the plurality of FAs as an FA to which switching is to be made, depending on the changed wireless environment, enabling a second FA transceiver that processes a signal transmitted/received over the second FA, and sending, to the mobile terminal, a scanning instruction message for instructing scanning of a reference signal transmitted over the second FA, and switching from the first FA to the second FA depending on scanning results, which are received from the mobile terminal in response to the scanning instruction message.

In accordance with another aspect of the present invention, an apparatus for switching an FA by a base station in a wireless communication system is provided. The apparatus includes a plurality of FA transceivers for individually processing signals transmitted/received over a plurality of FAs, an FA selector for selecting an FA to which switching is to be made, from among the plurality of FAs, and a controller for, upon detecting movement of the base station, performing communication with a mobile terminal using a first FA through a first FA transceiver among the plurality of FA transceivers, for, upon detecting a change in a wireless environment due to the movement, receiving information about a second FA that is selected by the FA selector depending on the changed wireless environment, for enabling a second FA transceiver that processes a signal transmitted/received over the second FA, among the plurality of FA transceivers, for sending a scanning instruction message for instructing scanning of a reference signal transmitted over the second FA, to the mobile terminal through the first FA transceiver, and for switching from the first FA to the second FA depending on scanning results, which are received from the mobile terminal in response to the scanning instruction message.

According to an exemplary embodiment of the present invention, any one of a plurality of sector antennas and an omni antenna may be used depending on the movement of a base station in a wireless communication system. When an omni antenna is used due to the movement of a base station, the base station allows a mobile terminal to switch an FA without interruption of services. A base station may effectively switch an FA used for its communication with a mobile terminal despite the change in a wireless environment, so the mobile terminal may continuously receive services without deterioration of service quality.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
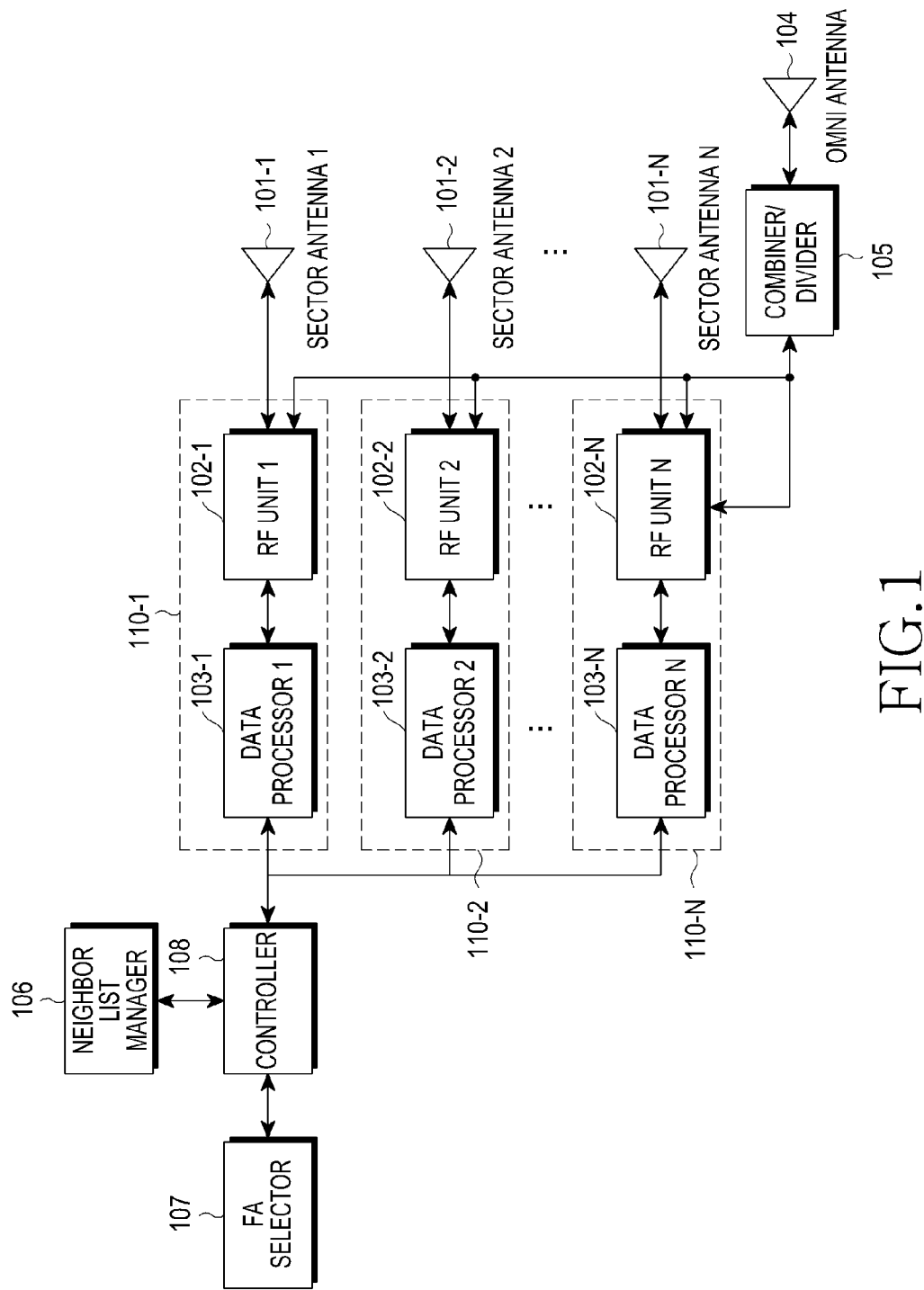
FIG. 1 shows a structure of a base station according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus for switching a Frequency Assignment (FA) in a wireless communication system, for example, an Institute of Electrical and Electronics Engineers (IEEE) 802.16e communication system. Specifically, exemplary embodiments of the present invention provide a method for more usefully switching an FA used for its communication with a mobile terminal by a base station, using a handover processing method defined in the IEEE 802.16e standard.

Although exemplary embodiments of the present invention will be described with reference to, for example, the IEEE 802.16e communication standard for convenience of description, the FA switching method and apparatus proposed by exemplary embodiments of the present invention may be applied not only to the IEEE 802.16e communication standard, but also to other communication systems.

A structure of a base station supporting FA switching according to an exemplary embodiment of the present invention will be described below with reference to FIG. 1. In the following description of exemplary embodiments of the present invention, the base station is assumed to be a mobile base station.

Figure 2A:
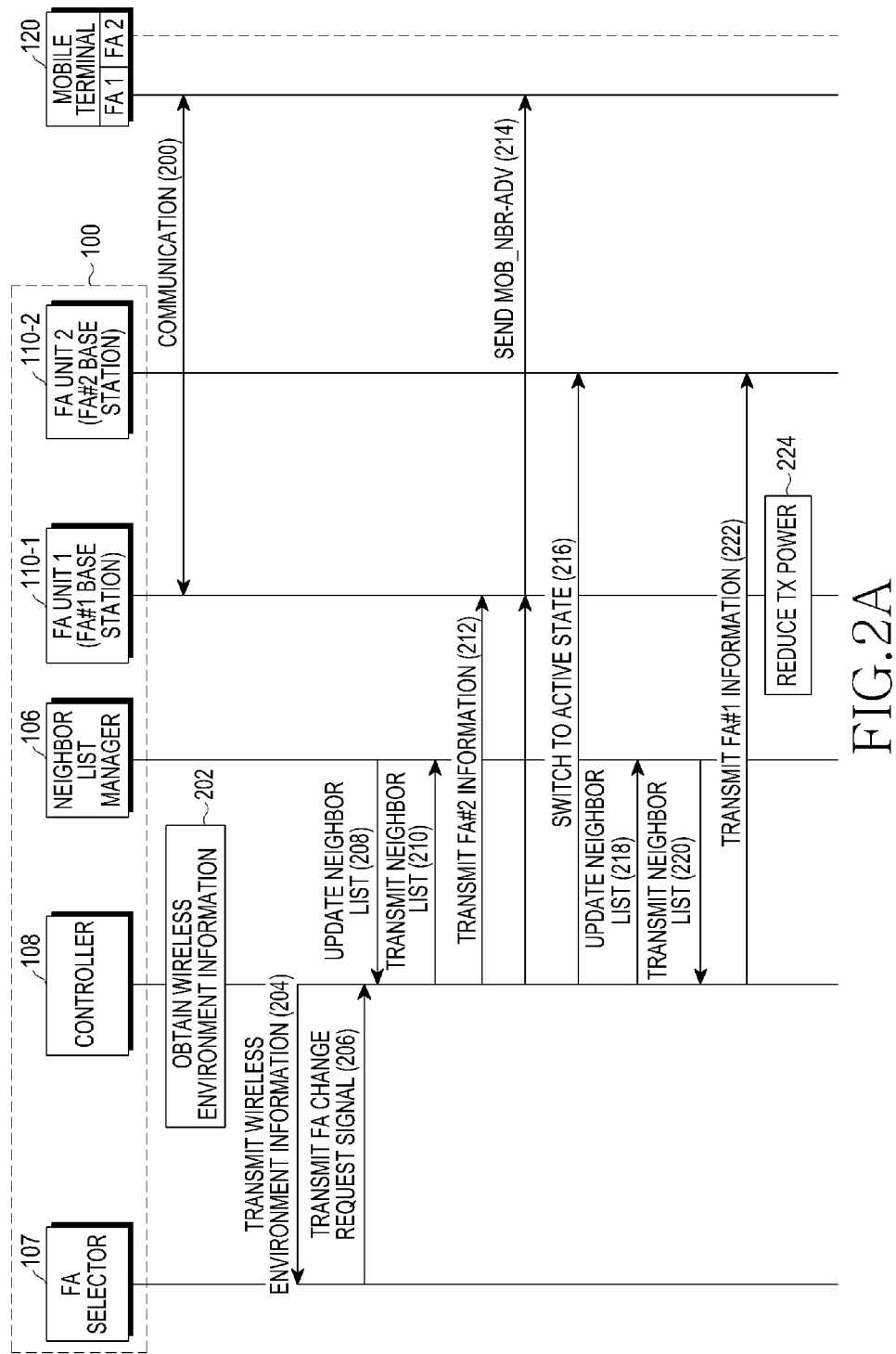
FIGS. 2A and 2B show a signal flow for a Frequency Assignment (FA) switching between a base station and a mobile terminal in a wireless communication system according to exemplary embodiments of the present invention.
Figure 2B:
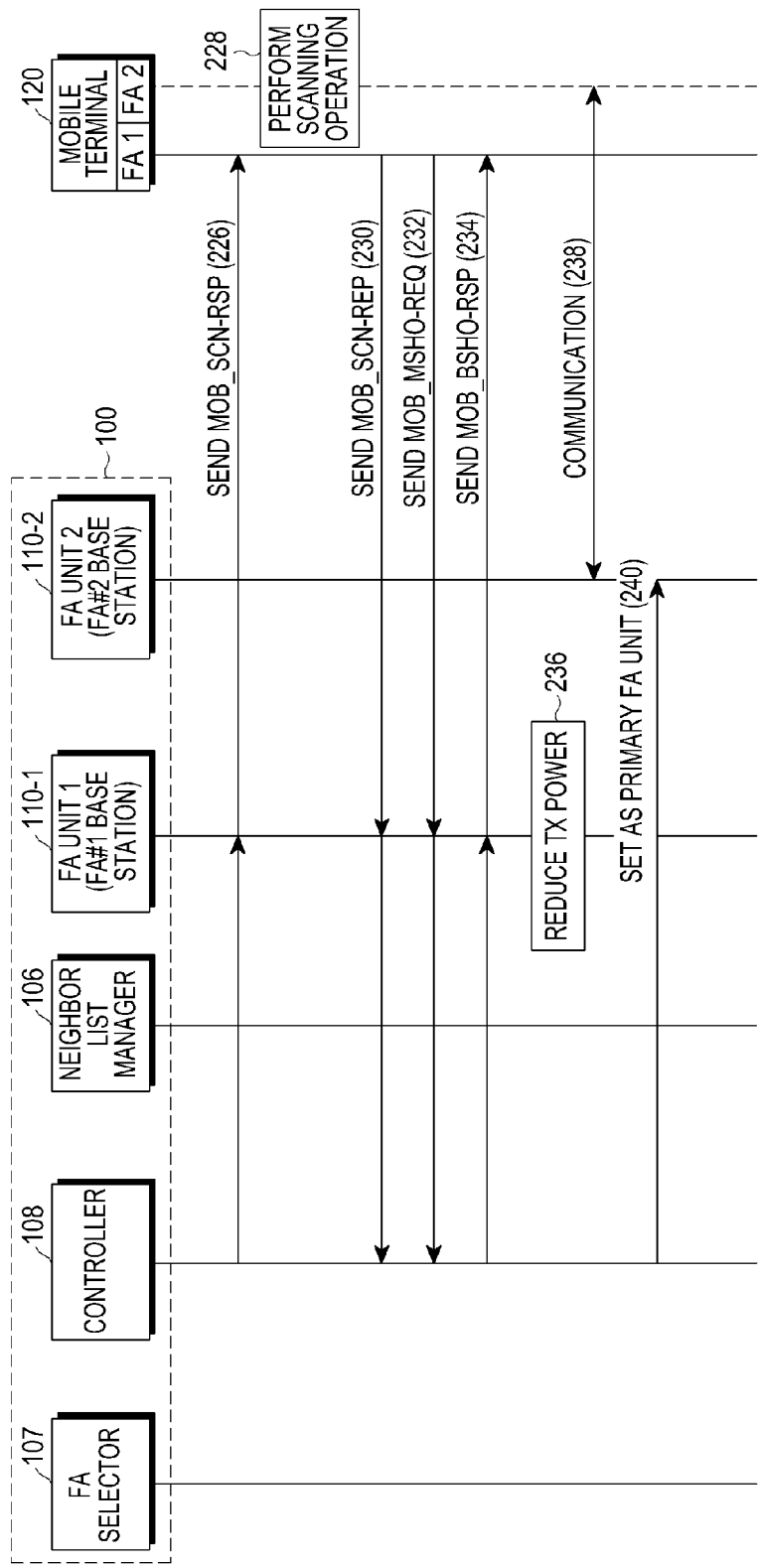

FIGS. 1 through 2B, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 shows a structure of a base station according to an exemplary embodiment of the present invention.

Referring to FIG. 1, the base station includes first to N-th sector antennas 101-1 to 101-N, first to N-th FA units 110-1 to 110-N, an omni antenna 104, a combiner/divider 105, a neighbor list manager 106, an FA selector 107, and a controller 108.

The first to N-th sector antennas 101-1 to 101-N perform wireless communication when the base station is stationary, and the omni antenna 104 performs wireless communication when the base station is moving.

The first to N-th sector antennas 101-1 to 101-N are connected to the first to N-th FA units 110-1 to 110-N, respectively, and used to perform communication for FA#1 to FA#N, respectively.

The omni antenna 104 is connected to the first to N-th FA units 110-1 to 110-N through the combiner/divider 105. The combiner/divider 105 combines signals output from the first to N-th FA units 110-1 to 110-N, and outputs the combined signal to the omni antenna 104. The combiner/divider 105 divides a signal received from the omni antenna 104 into N signals, and outputs the divided N signals to the first to N-th FA units 110-1 to 110-N, respectively. It will be understood by those of ordinary skill in the art that the combiner/divider 105 may be included as separate independent components.

The first to N-th FA units 110-1 to 110-N, serving as FA transceivers, are used to process signals transmitted/received over FA#1 to FA#N, respectively, when they are connected to the first to N-th sector antennas 101-1 to 101-N. When the first to N-th FA units 110-1 to 110-N are connected to the omni antenna 104, their operation/non-operation is determined depending on the FA used for their communication with a mobile terminal, among FA#1 to FA#N. For example, when the mobile terminal uses FA#1, the first FA unit 110-1 serves as a primary FA unit, while the other FA units 110-2 to 110-N operate in a power saving mode or ends their operation, serving as secondary FA units.

The first to N-th FA units 110-1 to 110-N include first to N-th Radio Frequency (RF) units 102-1 to 102-N, and first to N-th data processors 103-1 to 103-N, respectively.

The first to N-th data processors 103-1 to 103-N process data transmitted/received over FA#1 to FA#N, respectively, and the first to N-th RF units 102-1 to 102-N process radio signals over FA#1 to FA#N, respectively.

The neighbor list manager 106 stores and manages a neighbor list including information about neighbor base stations neighboring the base station. Specifically, the neighbor list manager 106, under control of the controller 108, changes and deletes neighbor base station information included in the neighbor list, or adds information about a new neighbor base station(s) in the neighbor list. The neighbor base station information may include FA information and Preamble Index (PI) information.

The FA selector 107 determines whether to change the FA that is presently used in the base station, based on wireless environment information obtained from the controller 108 according to a dynamic frequency selection technique. The FA selector 107 sends an FA change request signal to the controller 108 when it determines to change the FA that is presently used in the base station. The FA change request signal includes information about the FA selected by the FA selector 107, i.e., information about the FA that needs to be changed.

The controller 108 controls the overall operations of the first to N-th sector antennas 101-1 to 101-N, the first to N-th FA units 110-1 to 110-N, the omni antenna 104, the combiner/divider 105, the neighbor list manager 106, and the FA selector 107.

The controller 108 may use one of a plurality of FAs for its communication with a mobile terminal when the omni antenna 104 is used. One of the first to N-th FA units 110-1 to 110-N is set as a primary FA unit for communication with the mobile terminal, and the remaining FA units except for the primary FA unit are set as secondary FA units.

The first to N-th FA units 110-1 to 110-N may be regarded as virtual base stations that use FA#1 to FA#N, respectively. Accordingly, it should be noted herein that the first to N-th FA units 110-1 to 110-N, and FA#1 to FA#N base stations may be used in the same meaning.

The FA used for communication with the mobile terminal may be switched depending on the wireless environment information. Specifically, the FA may be switched depending on the following operation of the controller 108.

For example, it will be assumed herein that a base station and a mobile terminal communicate with each other using FA#1, and the mobile terminal is allowed to switch from FA#1 to FA#2 as it performs a handover from an FA#1 base station (or a serving base station) to an FA#2 base station (or a target base station). In this case, the first FA unit 110-1 is set as a primary FA unit, while the second to N-th FA units 110-2 to 110-N are set as secondary FA units.

The controller 108 periodically obtains wireless environment information by receiving a report on wireless environment measurement results from the mobile terminal or by measuring strengths of downlink signals from neighbor base stations.

The controller 108 transmits the obtained wireless environment information to the FA selector 107. Upon receiving an FA change request signal from the FA selector 107, the controller 108 updates a neighbor list by transmitting FA information (e.g., information about FA#2) included in the FA change request signal, to the neighbor list manager 106.

Thereafter, the controller 108 registers the FA#2 base station in the neighbor list as a neighbor base station of the FA#1 base station. If the neighbor list is updated, the controller 108 receives the updated neighbor list from the neighbor list manager 106, and transmits FA#2 information to the first FA unit 110-1. This is to allow the first data processor 103-1 included in the first FA unit 110-1 to generate Downlink Channel Descriptor (DCD) and Uplink Channel Descriptor (UCD) messages based on the FA#2 information.

If the generation of the DCD and UCD messages is completed in the first FA unit 110-1, the controller 108 sends a Mobile Neighbor Advertisement (MOB_NBR-ADV) message including the generated DCD and UCD messages to the mobile terminal.

To perform communication over FA#2, the controller 108 switches the second FA unit 110-2 to an active state, and sets the maximum transmission power of the second FA unit 110-2. The controller 108 registers the FA#1 base station in the neighbor list as a neighbor base station of the FA#2 base station.

Upon receiving the updated neighbor list from the neighbor list manager 106, the controller 108 transmits FA#1 information to the second FA unit 110-2. This is to allow the FA#2 base station to recognize the FA#1 base station as a neighbor base station and perform a handover process.

The controller 108 periodically reduces transmission power of the first FA unit 110-1 so that the mobile terminal may perform a handover to the FA#2 base station. This is to allow the mobile terminal to perform a handover to the FA#2 base station, determining that transmission power for FA#1 is less than transmission power for FA#2.

While the transmission power of the first FA unit 110-1 is reduced, the controller 108 sends a Mobile Scanning Interval Allocation Response (MOB_SCN-RSP) message including information (e.g., scanning interval information and a recommended-base station list) for a scanning operation of the mobile terminal, to the mobile terminal. The MOB_SCN-RSP message may be sent regardless of a scanning request from the mobile terminal.

The controller 108 receives a Scanning Result Report (MOB_SCN-RSP) message including the scanning results, from the mobile terminal.

The controller 108 receives a Mobile Station HandOver Request (MOB_MSHO-REQ) message from the mobile terminal when the mobile terminal needs to switch from the current serving base station to a new base station (e.g., the FA#2 base station) different from the FA#1 base station.

Thereafter, the controller 108 sends a Mobile BS HandOver Response (MOB_BSHO-RSP) message to the mobile terminal in response to the MOB_MSHO_REQ message. The MOB_BSHO-RSP message includes information (e.g., information about the FA#2 base station) about the recommended target base station. Accordingly, the mobile terminal may switch from the currently used FA#1 to FA#2 as it is handed over to the FA#2 base station.

If the mobile terminal continuously performs communication with the FA#1 base station even after the controller 108 sends the MOB_BSHO-RSP message, the controller 108 additionally reduces transmission power of the FA#1 base station so that a Carrier to interference-plus-Noise Ratio (CINR) and a Received Signal Strength Indication (RSSI) associated with the FA#2 base station may have lower values than CINR and RSSI associated with the FA#1 base station.

By repeatedly performing the above-described process of sending and receiving handover messages and the process of reducing transmission power of the FA#1 base station, the controller 108 controls all the mobile terminals that perform communication with the FA#1 base station, to perform a handover to the FA#2 base station.

The controller 108 transmits context information of mobile terminals, which includes authentication information and security information, to the FA#2 base station so that all the mobile terminals may continuously perform their communication by performing a handover to the FA#2 base station.

If a handover to the FA#2 base station by all the mobile terminals is completed, the controller 108 sets the second FA unit 110-2 as a primary FA unit, and sets the first FA unit 110-1 as a secondary FA unit. Transmission power of the first FA unit 110-1, which is set as the secondary FA unit, is set lower than that of the second FA unit 110-2, or the first FA unit 110-1 may transition to a power saving mode or may be powered off.

As a result, the mobile terminals may continuously perform seamless services communication over FA#2 to which the switching is made through the above-described handover process.

Next, a signal flow for FA switching between a base station and a mobile terminal in a wireless communication system according to an exemplary embodiment of the present invention will be described with reference to FIGS. 2A and 2B.

FIGS. 2A and 2B show a signal flow for FA switching between a base station and a mobile terminal in a wireless communication system according to exemplary embodiments of the present invention.

Referring to FIGS. 2A and 2B, the signal flow is performed as follows.

A base station 100 and a mobile terminal 120 perform communication with each other through a first FA unit 110-1 using FA#1 in step 200. While the communication through the first FA unit 110-1 is performed, the controller 108 receives a report on wireless environment measurement results from the mobile terminal 120 or obtains wireless environment information by measuring strengths of downlink signals from neighbor base stations in step 202.

In step 204, the controller 108 transmits the obtained wireless environment information to the FA selector 107. Upon receiving an FA change request signal from the FA selector 107 in step 206, the controller 108 updates a neighbor list by transmitting FA information (e.g., FA#2 information) included in the update neighbor list signal received from the neighbor list manager 106, in step 208. The controller 108 registers the FA#2 base station in the neighbor list as a neighbor base station of the FA#1 base station. As described above, the FA#1 base station and the FA#2 base station may refer to virtual base stations corresponding to the first FA unit 110-1 and the second FA unit 110-2, respectively.

If the neighbor list is updated, the controller 108 transmits the updated neighbor list to the neighbor list manager 106 in step 210. In step 212, the controller 108 transmits FA#2 information to the first FA unit 110-1. Accordingly, the first data processor 103-1 included in the first FA unit 110-1 generates a DCD message based on the FA#2 information.

If the generation of DCD and UCD messages is completed in the first FA unit 110-1, the controller 108 sends a MOB_NBR-ADV message including the generated DCD and UCD messages to the mobile terminal 120 in step 214.

In step 216, the controller 108 switches the second FA unit 110-2 to an active state and sets the maximum transmission power of the second FA unit 110-2, to perform communication over FA#2.

In step 218, the controller 108 updates the neighbor list by registering the FA#1 base station in the neighbor list as a neighbor base station of the FA#2 base station. The process of step 218 may be performed in step 208. In other words, the process of registering the FA#2 base station in the neighbor list as a neighbor base station of the FA#1 base station, and the process of registering the FA#1 base station in the neighbor list as a neighbor base station of the FA#2 base station may both be performed in step 208.

Upon receiving the updated neighbor list from the neighbor list manager 106 in step 220, the controller 108 transmits FA#1 information to the second FA unit 110-2 in step 222. This is to allow the FA#2 base station to recognize the FA#1 base station as a neighbor base station and perform a handover process.

The controller 108 periodically reduces transmission power of the first FA unit 110-1 in step 224 so that the mobile terminal 120 may perform a handover to the FA#2 base station. The controller 108 periodically reduces transmission power of the first FA unit 110-1 in step 236 which corresponds to the time at which the handover is completed by the mobile terminal 120 and all the other mobile terminals that perform communication with the base station 100 through the mobile terminal 120 and the first FA unit 110-1.

While the transmission power of the first FA unit 110-1 is reduced, the controller 108 sends a MOB_SCN-RSP message including information for a scanning operation of the mobile terminal 120, to the mobile terminal 120 in step 226 in FIG. 2B. The MOB_SCN-RSP message may be sent regardless of a scanning request from the mobile terminal.

In step 228, the mobile terminal 120 performs a scanning operation by measuring strengths of reference signals (e.g., preamble signals) from recommended base stations including the FA#2 base station depending on scanning interval information included in the MOB_SCN-RSP message.

In step 230, the controller 108 receives a MOB_SCN-REP message including the scanning results from the mobile terminal 120. In step 232, the controller 108 receives a MOB_MSHO-REQ message from the mobile terminal 120, if the mobile terminal 120 determines to switch from the current serving base station to the FA#2 base station.

In step 234, the controller 108 sends a MOB_BSHO-RSP message to the mobile terminal 120 in response to the MOB_MSHO-REQ message. The MOB_BSHO-RSP message may include information about the FA#2 base station as information about recommended target base stations. Accordingly, the mobile terminal 120 may be handed over the FA#2 base station.

If the mobile terminal 120 continuously performs communication with the FA#1 base station even after the controller 108 sends the MOB_BSHO-RSP message, the controller 108 additionally reduces transmission power of the FA#1 base station so that CINR and RSSI associated with the FA#2 base station may have lower values than CINR and RSSI associated with the FA#1 base station. By repeatedly performing steps 226 to 236, the controller 108 controls all the mobile terminals that perform communication with the FA#1 base station, to perform a handover to the FA#2 base station.

The controller 108 controls the FA#1 base station to transmit context information of the mobile terminal 120, which includes authentication information and security information, to the FA#2 base station so that the mobile terminal 120 may continuously perform communication by making a handover to the FA#2 base station.

Upon completion of its handover to the FA#2 base station, the mobile terminal 120 performs communication with the FA#2 base station through the second FA unit 110-2 in step 238.

Accordingly, in step 240, the controller 108 sets the second FA unit 110-2 as a primary FA unit and sets the first FA unit 110-1 as a secondary FA unit. Transmission power of the first FA unit 110-1, which is set as the secondary FA unit, is set lower than that of the second FA unit 110-2, or the first FA unit 110-1 may transition to a power saving mode or may be powered off.

As is apparent from the foregoing description, according to exemplary embodiments of the present invention, a base station may continuously provide services to mobile terminals using a handover method without degradation of service quality even while it is moving.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for switching a Frequency Assignment (FA) by a base station in a wireless communication system, the method comprising:
   upon detecting movement of the base station, performing communication with a mobile terminal using a first FA through a first FA transceiver among a plurality of FA transceivers, each of which individually processes a signal transmitted/received over each of a plurality of FAs;
   upon detecting a change in a wireless environment due to the movement, selecting a second FA from among the plurality of FAs as an FA to which switching is to be made, depending on the changed wireless environment;
   enabling a second FA transceiver that processes a signal transmitted/received over the second FA, and sending, to the mobile terminal, a scanning instruction message for instructing scanning of a reference signal transmitted over the second FA; and
   switching from the first FA to the second FA depending on scanning results, which are received from the mobile terminal in response to the scanning instruction message.

2. The method of claim 1, further comprising periodically reducing transmission power of the first FA transceiver, after enabling the second FA transceiver.

3. The method of claim 2, wherein the transmission power of the first FA transceiver is reduced until all of mobile terminals, which perform communication with the base station through the first FA transceiver, switch from the first FA to the second FA.

4. The method of claim 1, wherein the switching comprises:
   receiving a handover request message, in which information about a target base station is set as information about the second FA, from the mobile terminal depending on the scanning results;
   sending, to the mobile terminal, a handover response message including information for instructing execution/non-execution of handover to the second FA; and
   switching from the first FA to the second FA depending on the information for instructing execution/non-execution of handover, which is included in the handover response message.

5. The method of claim 1, wherein the switching comprises setting the first FA transceiver, which was used as a primary FA transceiver, as a secondary FA transceiver, and setting the second FA transceiver, which was used as the secondary FA transceiver, as the primary FA transceiver.

6. The method of claim 5, further comprising, after setting the first FA transceiver as the secondary FA transceiver, setting transmission power of the first FA transceiver to be lower than transmission power of the second FA transceiver, or transitioning the first FA transceiver to a power saving mode and a power-off mode.

7. An apparatus for switching a Frequency Assignment (FA) by a base station in a wireless communication system, the apparatus comprising:
   a plurality of FA transceivers configured to individually process signals transmitted/received over a plurality of FAs;
   an FA selector configured to select an FA to which switching is to be made, from among the plurality of FAs; and
   a controller configured to, upon detecting movement of the base station, perform communication with a mobile terminal using a first FA through a first FA transceiver among the plurality of FA transceivers, for to, upon detecting a change in a wireless environment due to the movement, receive information about a second FA that is selected by the FA selector depending on the changed wireless environment, to enable a second FA transceiver that processes a signal transmitted/received over the second FA, among the plurality of FA transceivers, to send a scanning instruction message for instructing scanning of a reference signal transmitted over the second FA, to the mobile terminal through the first FA transceiver, and to switch from the first FA to the second FA depending on scanning results, which are received from the mobile terminal in response to the scanning instruction message.

8. The apparatus of claim 7, wherein the controller is configured to periodically reduce transmission power of the first FA transceiver, after enabling the second FA transceiver.

9. The apparatus of claim 8, wherein the transmission power of the first FA transceiver is reduced until all of mobile terminals, which perform communication with the base station through the first FA transceiver, switch from the first FA to the second FA.

10. The apparatus of claim 7, wherein the controller is configured to receive a handover request message, in which information about a target base station is set as information about the second FA, from the mobile terminal depending on the scanning results, to send, to the mobile terminal, a handover response message including information for instructing execution/non-execution of handover to the second FA, and to switch from the first FA to the second FA depending on the information for instructing execution/non-execution of handover, which is included in the handover response message.

11. The apparatus of claim 7, wherein the switching from the first FA to the second FA comprises, setting the first FA transceiver, which was used as a primary FA transceiver, as a secondary FA transceiver, and setting the second FA transceiver, which was used as the secondary FA transceiver, as the primary FA transceiver.

12. The apparatus of claim 11, wherein after the setting of the first FA transceiver as the secondary FA transceiver, the controller is configured to set transmission power of the first FA transceiver to be lower than transmission power of the second FA transceiver, or to transition the first FA transceiver to a power saving mode and a power-off mode.

13. The apparatus of claim 7, wherein the plurality of FA transceivers further includes:
   a plurality of Radio Frequency (RF) units configured to individually process radio signals for the plurality of FAs; and
   a plurality of data processors configured to individually process data for the plurality of FAs.

14. The apparatus of claim 7, further comprising:
   a plurality of sector antennas configured to individually perform wireless communication over the plurality of FAs when the base station is stationary; and an omni antenna configured to perform wireless communication over one of the plurality of FAs, when the base station is moving.

15. The apparatus of claim 14, further comprising:

a divider, located between the plurality of FA transceivers and the omni antenna, configured to divide a signal received from the omni antenna, and to output signals resulting from the divided signal received from the omni antenna to the plurality of FA transceivers; and a combiner configured to combine signals output from the plurality of FA transceivers and to output the combined signal to the omni antenna.

* * * * *